No. 780,912. Patented January 24, 1905.

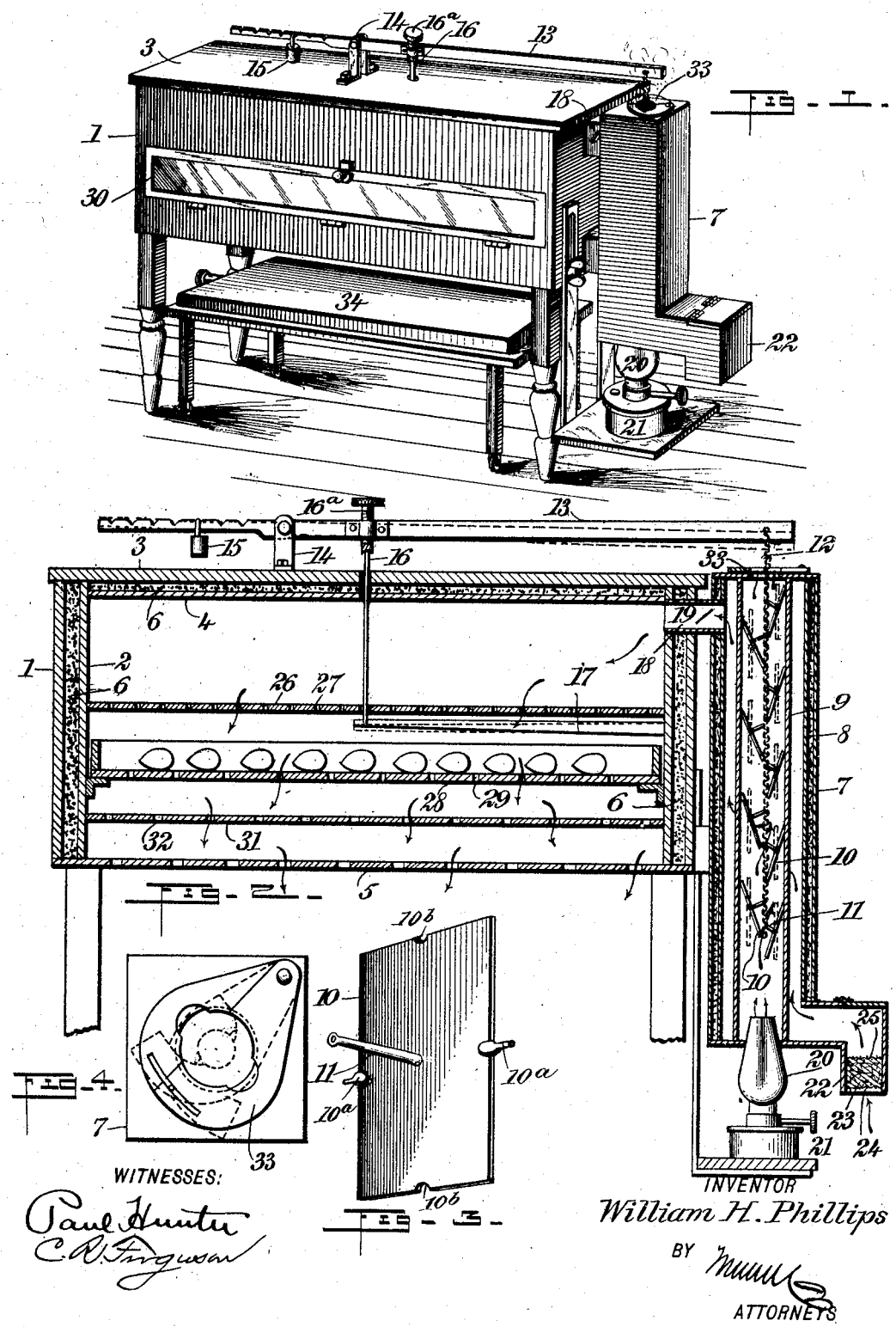

UNITED STATES PATENT OFFICE.

WILLIAM HENRY PHILLIPS, OF BELLEVILLE, NEW YORK.

INCUBATOR.

SPECIFICATION forming part of Letters Patent No. 780,912, dated January 24, 1905.

Application filed November 28, 1903. Serial No. 182,976.

*To all whom it may concern:*

Be it known that I, WILLIAM HENRY PHILLIPS, a citizen of the United States, and a resident of Belleville, in the county of Jefferson and State of New York, have invented a new and Improved Incubator, of which the following is a full, clear, and exact description.

This invention relates to improvements in incubators for hatching the eggs of fowls, an object being to provide an incubator with a novel means for maintaining a constant circulation of air at an even temperature and in a proper moist condition.

I will describe an incubator embodying my invention and then point out the novel features in the appended claims.

Reference is to be had to the accompanying drawings, forming a part of this specification, in which similar characters of reference indicate corresponding parts in all the figures.

Figure 1 is a perspective view of an incubator embodying my invention. Fig. 2 is a sectional elevation thereof. Fig. 3 is a perspective view of one of a set of deflectors employed, and Fig. 4 is a plan view showing a two-part damper on the heater.

The incubator consists of a casing comprising outer walls 1, inner walls 2, a top wall 3, an inner top wall 4, and a perforated bottom wall 5. Between the side, end, and top walls a packing 6 is arranged, the said packing consisting of mineral wool or other suitable material designed to prevent the escape of heat, excepting as hereinafter described.

Arranged at one side of the casing is a heating-box 7, having double walls with a suitable packing 8 between the same. Extended upward through the heating-box is a flue 9, in which is arranged a plurality of swinging deflectors 10, the said deflectors being pivoted at the center of their side edges to walls of the flue, and they are arranged at opposite sides of the flue in staggered relation, and the pivots are shown at $10^a$, Fig. 3. Each deflector has an inwardly-extended arm 11, attached to a drawing device 12, which may consist of a chain connected at its outer end to a lever 13, pivoted to a post 14 and having a weight 15 adjustable on it. The deflectors are provided with notches $10^b$ at the upper and lower ends. The lower notches will receive the chain, permitting the same to have free movement when the deflectors are in closed position. By forming the notches in both ends the deflectors may be conveniently assembled either end down. From the lever 13 a rod 16 extends down through an opening in the top of the casing and connects with a thermostatic rod 17, arranged in the casing, and as a means for causing adjustments between the lever and thermostat, and thus regulate the heat, a screw $16^a$, operating in the lever, receives the upper end of the rod 16. The upper end of the heating-box 7 communicates with the interior of the casing through a flue 18, in which a damper 19 is arranged.

It will be noted that the heating-box extends considerably below the bottom of the incubator-casing, and an opening in the bottom of the box is designed to receive the chimney 20 of a lamp 21. At one side of the box 7 and communicating therewith at the bottom is a receptacle 22 for holding a moist sponge 23, so as to supply suitable moisture to the heated air. The bottom wall of this receptacle consists of a netting 24, and a netting 25 may be placed above the sponge.

Arranged in the incubator below the flue 18 is a horizontal diaphragm 26, provided with perforations 27, and below this partition 26 is a tray 28, on which the eggs are to be placed. The bottom wall of this tray is perforated, as indicated at 29, and it is arranged to slide in and out of the incubator in the form of a drawer, a door 30, provided with glass panels, being arranged to swing in the opening through which the tray may pass, and below the tray is a diaphragm 31, perforated, as at 32.

In the operation the air will pass through the wet sponge 23 and thence along the outer side of the flue 9, where it will be heated and pass into the incubator, as before stated, at the upper portion thereof. The hot air thus admitted will force the cold air through the perforations of the diaphragm 26, thence through the egg-tray and diaphragm 31, and out through the bottom of the incubator. The heat will be automatically regulated by the opening and closing of the deflectors 10 under the influence of the thermostatic rod 17, and a valve 33 at the upper end of the flue 9 by its degree of opening will govern the amount of draft for the lamp. By extending the heating-box 7 below the bottom of the incubator additional force is given to the hot air to drive the air that has lost a portion of its heat down and out of the incubator, and it is to be understood that the chimney 20 has a tight fit in the opening at the bottom of the heating-box, so as to prevent the entrance of cold air around the chimney, thus reducing the temperature.

It may be further stated in regard to the deflectors 10 that they will more or less retard the flow of air through the flue 9, depending upon the degree of opening, and by retarding the air it is obvious that it will be held longer under the influence of the heat from the lamp. As the end of the lever 13 moves down the weight of the chain 12 will swing the deflectors toward open position.

It will be noted that the upper portion of the incubator is practically air-tight and that the upper chamber is deeper than the other chamber. By thus providing a deep upper chamber the air will have a chance to blend together by its own gravity before passing through the upper diaphragm, and it will be further noted that the perforations are progressively smaller from the bottom 5 upward, and thus the air is somewhat retarded in its downward passage.

It is well understood that during the hatching the eggs at certain intervals must be turned over in the tray and that while so turning them the incubator temperature must be practically maintained. As a convenient means for maintaining the temperature I provide a hot-water box 34, upon which the tray may be placed during the turning of the eggs.

Having thus described my invention, I claim as new and desire to secure by Letters Patent—

1. An incubator comprising a casing, a heating-box arranged at one end thereof and having a portion extended below the bottom of the incubator-casing, the bottom end of the heating-box being provided with an opening, an offset at the lower end of the heating-box and communicating therewith and forming a receptacle for a dampening material, a flue connecting the upper portion of the heating-box with the interior of the incubator-casing, a flue extended upward through said box, swinging deflectors arranged in staggered relation in said flue, and a thermostatic rod within the incubator having connection with said deflectors.

2. An incubator comprising a casing, a heating-box having communication at its upper portion with the upper portion of said incubator-casing, a receptacle communicating with the lower end of said box and adapted to receive a moistening device, a perforated bottom for said receptacle, a flue extended upward through the heating-box, a plurality of swinging deflectors arranged alternately at opposite sides in said flue, a lever mounted to swing on the casing, a connection between said lever and the deflectors, a thermostat in the incubator, and a connection between said lever and thermostat.

3. An incubator comprising a casing, an air-heating box arranged adjacent thereto and communicating with the incubator at the upper portion, the said heating-box being extended below the bottom of the incubator, and a plurality of connected swinging deflectors for regulating the passage of heat through the box.

4. An incubator comprising a casing, a transverse partition arranged in said casing and having perforations, the bottom of said casing being provided with perforations, a perforated tray mounted to slide in the casing, and a plurality of automatically-actuated swinging deflectors for regulating heated air passing into the casing.

In testimony whereof I have signed my name to this specification in the presence of two subscribing witnesses.

WILLIAM HENRY PHILLIPS.

Witnesses:
S. H. KEYES,
GEO. M. KEYES.